UNITED STATES PATENT OFFICE.

A. LEBKÜCHER, OF BELLEVILLE, ILLINOIS.

IMPROVEMENT IN LUBRICATING COMPOUNDS.

Specification forming part of Letters Patent No. 32,631, dated June 25, 1861.

*To all whom it may concern:*

Be it known that I, ADAM LEBKÜCHER, of Belleville, in the county of St. Clair and State of Illinois, have invented a new and Improved Lubricating Compound; and I do hereby declare that the following is a full, clear, and exact description of the same.

My invention consists of an improved lubricating compound made in the following manner: I dissolve a quantity of zinc in muriatic acid of the ordinary temperature without the aid of heat, using sufficient zinc to saturate the acid. Then I heat about one pound (1 lb.) of this solution in one hundred pounds (100 lbs.) of rosin-oil to 160° to 165° Fahrenheit, whereby the impurities are separated and the oil is rendered clear and liquid. After the oil has been thus refined, I pour forty gallons (40 gals.) of the same into a kettle and heat it to 140° Fahrenheit, and I now mix it with about twenty pounds (20 lbs.) of pure slaked lime previously reduced to a fine powder, and the temperature is now raised to 190° Fahrenheit for about half an hour. After the lapse of this time, the mixture is drawn off and left to cool quietly, and after it has cooled forty gallons (40 gals.) of the same are mixed with one gallon (1 gal.) of olive-oil and with two gallons (2 gals.) of soft water, either rain-water or water from a river, and the whole is stirred well until it turns into a whitish butter-like mass, which can be used for lubricating purposes without further delay. By the action of the solution of zinc and by the subsequent treatment with lime all the gummy substances contained in the rosin-oil are removed or rendered innoxious, and a lubricator is produced which is cheap, free from gum, and which, on account of its peculiar lubricating qualities, is particularly fit for greasing wagon-axles, but which can be used with advantage for all kinds of journals or other parts of machinery that are exposed to friction.

Having thus fully described my invention, what I claim as new, and desire to secure by Letters Patent, is—

The lubricating compound derived from the use of rosin-oil, muriatic acid, zinc, lime, olive-oil, and water, in the manner herein set forth.

ADAM LEBKÜCHER.

Witnesses:
H. BURCKHARDT,
S. C. FRITRAM.